US012655257B2

(12) United States Patent
Lee

(10) Patent No.: US 12,655,257 B2
(45) Date of Patent: Jun. 16, 2026

(54) PREPARATION METHOD OF SUPER ABSORBENT POLYMER

(71) Applicant: LG Chem, Ltd., Seoul (KR)

(72) Inventor: Junwye Lee, Daejeon (KR)

(73) Assignee: LG Chem, Ltd., Seoul (KR)

(*) Notice: Subject to any disclaimer, the term of this patent is extended or adjusted under 35 U.S.C. 154(b) by 507 days.

(21) Appl. No.: 18/282,393

(22) PCT Filed: Dec. 8, 2022

(86) PCT No.: PCT/KR2022/019923

§ 371 (c)(1),
(2) Date: Sep. 15, 2023

(87) PCT Pub. No.: WO2023/121075

PCT Pub. Date: Jun. 29, 2023

(65) Prior Publication Data

US 2024/0034844 A1 Feb. 1, 2024

(30) Foreign Application Priority Data

Dec. 24, 2021 (KR) ........................ 10-2021-0187421

(51) Int. Cl.

*C08J 3/075* (2006.01)
*C08J 3/12* (2006.01)
*C08J 3/24* (2006.01)

(52) U.S. Cl.

CPC ................. *C08J 3/075* (2013.01); *C08J 3/12* (2013.01); *C08J 3/245* (2013.01); *C08J 2333/02* (2013.01)

(58) Field of Classification Search

CPC .... C08J 2333/02; C08J 2333/08; C08J 3/075; C08J 3/12; C08J 3/14; C08J 3/243; C08J 3/245; B01J 20/267
See application file for complete search history.

(56) References Cited

U.S. PATENT DOCUMENTS

2010/0099781 A1 4/2010 Tian et al.
2013/0079221 A1 3/2013 Tian et al.
2018/0237593 A1 8/2018 Nam et al.
2019/0315930 A1 10/2019 Kim et al.
2020/0207929 A1 7/2020 Nam et al.
2020/0247960 A1 8/2020 Park et al.
2020/0406228 A1 12/2020 Min et al.
2021/0147637 A1 5/2021 Matsumoto et al.
2021/0229070 A1 7/2021 Sohn et al.
2021/0379563 A1 12/2021 Kim et al.

FOREIGN PATENT DOCUMENTS

CN 110557949 A 12/2019
EP 3770206 A1 1/2021
JP 2008533213 A 8/2008
JP 2012506462 A 3/2012
KR 20110087293 A 8/2011
KR 20170043838 A 4/2017
KR 20180003815 A 1/2018
KR 20190003351 A 1/2019
KR 20190072294 A * 6/2019 ............. C08J 3/245
KR 20200056050 A 5/2020
KR 20210031364 A 3/2021
KR 20210038081 A 4/2021
KR 20210042031 A 4/2021
KR 20210097895 A 8/2021
WO 2006101271 A1 9/2006
WO 2019221235 A1 11/2019

OTHER PUBLICATIONS

KR20190072294 English machine translation, prepared Mar. 19, 2026. (Year: 2026).*
Extended European Search Report for Application No. 22911708.0 dated Aug. 12, 2024, pp. 1-6.
Schwalm, R. "UV Coatings Basics, Recent Developments and New Application," Elsevier Science, Dec. 21, 2006, p. 115. (3 pgs.).
Odian, G. "Principles of Polymerization" John Wiley & Sons, Inc, Dec. 1981, p. 203, (3 pgs.).
International Search Report for Application No. PCT/KR2022/019923 mailed Mar. 17, 2023. 3 pages.

* cited by examiner

*Primary Examiner* — Christopher M Rodd
(74) *Attorney, Agent, or Firm* — Lerner David LLP

(57) ABSTRACT

The present disclosure relates to a preparation method of a super absorbent polymer. More specifically, it relates to a preparation method of a super absorbent polymer, which can improve a drying efficiency in the preparation process and realize excellent absorption-related properties of the prepared super absorbent polymer by using a specific inorganic material in the reassembly process.

10 Claims, No Drawings

PREPARATION METHOD OF SUPER ABSORBENT POLYMER

CROSS-REFERENCE TO RELATED APPLICATIONS

The present application is a national phase entry under 35 U.S.C. § 371 of International Application No. PCT/KR2022/019923, filed on Dec. 8, 2022, which claims priority from Korean Patent Application No. 10-2021-0187421, filed on Dec. 24, 2021, the disclosures of which are incorporated herein by reference in their entirety.

TECHNICAL FIELD

The present disclosure relates to a preparation method of a super absorbent polymer.

BACKGROUND OF ART

A super absorbent polymer (SAP) is a type of synthetic polymeric material capable of absorbing 500 to 1000 times its own weight of moisture. Such super absorbent polymers started to be practically applied in sanitary products, and they are now being widely used not only for hygiene products such as disposable diapers for children, etc., but also for water retaining soil products for gardening, water stop materials for the civil engineering and construction, sheets for raising seedling, fresh-keeping agents for food distribution fields, materials for poultices, or the like.

An absorption mechanism of the super absorbent polymer is governed by interaction of penetration pressure due to the difference in electrical attraction caused by charges of a polymer electrolyte, affinity between water and a polymer electrolyte, molecular expansion due to repulsion between polymer electrolyte ions, and inhibition of expansion due to cross-linking. In other words, water absorbency of the super absorbent polymer depends on the affinity and molecular expansion, and an absorption rate is largely dependent on the osmotic pressure of the absorbent polymer itself.

Meanwhile, particles having a particle diameter of 150 μm or less, which are inevitably generated in the preparation of a super absorbent polymer, are called a fine powder (fines), and it is known that the fine powder is generated in an amount of about 20 to 30% in the pulverization or transfer process during the preparation of a super absorbent polymer. When the fine powder is included in the super absorbent polymer, it may cause a reduction in main physical properties of the super absorbent polymer such as absorbency under pressure or water permeability. For this reason, during the preparation of a super absorbent polymer, particularly in a classification process, the fine powder is separated to produce the super absorbent polymer only with the remaining polymer particles.

In addition, the fine powder separated in this way is made into large particles by a reassembly process, and a method of making/using theses reassembled particles again into/as a super absorbent polymer is known. In particular, as a representative method of the reassembly process, there is an agglomeration method of mixing the fine powder with water to prepare a fine reassembly and a super absorbent polymer.

However, when the amount of water used is increased in such a reassembly process, the amount of energy consumed during drying increases, resulting in high costs. Furthermore, if moisture is not properly removed by drying after reassembly, problems such as an increase in the load on the apparatus for preparing a super absorbent polymer may occur.

Conversely, when the amount of water used in the reassembly process is reduced, cohesive strength of the assembly is not sufficient, and as a result, reassembly is not performed properly and the generation amount of re-fines which are reduced again into the fine powder increases greatly. In addition, there is a problem in that physical properties such as absorbency of the super absorbent polymer prepared by the reassembly process are not sufficient.

Accordingly, the development of a reassembly process of the fine powder capable of solving the above-mentioned problems is continuously required.

DETAILED DESCRIPTION OF THE INVENTION

Technical Problem

In the present disclosure, there is provided a preparation method of a super absorbent polymer capable of solving the above problems by using a specific inorganic material when reassembling the fine powder inevitably obtained in the preparation of the super absorbent polymer.

Technical Solution

There is provided a preparation method of a super absorbent polymer, including: a polymerization step of cross-linking polymerizing a water-soluble ethylene-based unsaturated monomer having at least partially neutralized acidic groups in the presence of a polymerization initiator and an internal cross-linking agent to form a hydrogel polymer; a gel pulverization step of pulverizing the hydrogel to form hydrogel particles; a first classification step of drying, pulverizing, and classifying the hydrogel particles to separate them into a base resin normal powder and a base resin fine powder; a surface cross-linking step of cross-linking the surface of the base resin powder in the presence of a surface cross-linking agent to form super absorbent polymer particles; and a second classification step of classifying the super absorbent polymer particles into a super absorbent polymer normal powder and a super absorbent polymer fine powder; wherein the base resin fine powder and the super absorbent polymer fine powder are mixed with an aqueous dispersion of a water-insoluble inorganic salt to prepare a fine reassembly, and the fine reassembly is reintroduced to the gel pulverization step.

In the present disclosure, the terms "the first", "the second", and the like are used to describe a variety of components, and these terms are merely employed to distinguish a certain component from other components.

The terms used in the description of the present invention is intended for the purpose of describing embodiments only and is not intended to limit the present invention.

Singular expressions of the present disclosure may include plural expressions unless they are differently expressed contextually.

In the present disclosure, the terms "include", "comprise", or "have" are used to describe stated features, numbers, steps, components, or combinations thereof, but do not preclude the addition of one or more other features, numbers, steps, components, or combinations thereof.

Also, as used herein, when a layer or an element is mentioned to be formed "on" layers or elements, the layer or element may be directly formed on the layers or elements, or other layers or elements may be additionally formed between the layers, on a subject, or on a substrate.

As the present invention can be variously modified and have various forms, specific embodiments thereof are shown by way of examples and will be described in detail. However, it is not intended to limit the present invention to the particular form disclosed and it should be understood that the present invention includes all modifications, equivalents, and replacements within the idea and technical scope of the present invention.

There is provided a preparation method of a super absorbent polymer, including: a polymerization step of cross-linking polymerizing a water-soluble ethylene-based unsaturated monomer having at least partially neutralized acidic groups in the presence of a polymerization initiator and an internal cross-linking agent to form a hydrogel polymer; a gel pulverization step of pulverizing the hydrogel to form hydrogel particles; a first classification step of drying, pulverizing, and classifying the hydrogel particles to separate them into a base resin normal powder and a base resin fine powder; a surface cross-linking step of cross-linking the surface of the base resin powder in the presence of a surface cross-linking agent to form super absorbent polymer particles; and a second classification step of classifying the super absorbent polymer particles into a super absorbent polymer normal powder and a super absorbent polymer fine powder; wherein the base resin fine powder and the super absorbent polymer fine powder are mixed with an aqueous dispersion of a water-insoluble inorganic salt to prepare a fine reassembly, and the fine reassembly is reintroduced to the gel pulverization step.

The present inventors have found that when an aqueous dispersion of a specific water-insoluble inorganic salt is used in the preparation of a fine reassembly, a drying efficiency can be improved by reducing the amount of water input while maintaining reassembly strength, which led to the completion of the present-technology.

Hereinafter, the preparation method of a super absorbent polymer of one embodiment will be described in more detail for each step.

The "polymer" in the present disclosure is in a state in which a water-soluble ethylene-based unsaturated monomer is polymerized, and may include all moisture content ranges, all particle diameter ranges, all surface cross-linking states, or processing states. Among the polymers, a polymer having a moisture content of about 40 wt % or more which is in a state after polymerization and before drying may be referred to as a hydrogel polymer. In addition, a polymer having a particle diameter of 150 μm or less may be referred to as a "fine powder".

The "super absorbent polymer" refers to the polymer itself, or includes all the polymers that have been made suitable for commercialization through additional processes such as surface cross-linking, fine reassembly, drying, pulverization, classification, etc., depending on the context.

In the preparation method according to one embodiment, a hydrogel polymer is first prepared.

Specifically, the step of preparing the hydrogel polymer is a step of forming the hydrogel polymer by cross-linking polymerization of a monomer composition containing a water-soluble ethylene-based unsaturated monomer having at least partially neutralized acidic groups in the presence of a foaming agent.

The water-soluble ethylene-based unsaturated monomer may be any monomer commonly used in the preparation of a super absorbent polymer. Specifically, the water-soluble ethylene-based unsaturated monomer may be a compound represented by the following Chemical Formula 1:

[Chemical Formula 1]

$$R^1\text{—COOM}^1$$

in Chemical Formula 1, $R^1$ is a C2 to C5 alkyl group having an unsaturated bond, and $M^1$ is a hydrogen atom, a monovalent or divalent metal, an ammonium group, or an organic amine salt.

Preferably, the water-soluble ethylene-based unsaturated monomer may be at least one selected from the group consisting of acrylic acid, methacrylic acid, and a monovalent metal salt, a divalent metal salt, an ammonium salt and an organic amine salt of the acid. When acrylic acid and/or a salt thereof is used as a water-soluble ethylene-based unsaturated monomer, it is advantageous to obtain a super absorbent polymer having improved absorption performance. In addition, at least one selected from the group consisting of an anionic monomer of maleic anhydride, fumalic acid, crotonic acid, itaconic acid, 2-acryloylethane sulfonic acid, 2-methacryloylethane sulfonic acid, 2-(meth)acryloylpropanesulfonic acid, or 2-(meth)acrylamide-2-methyl propanesulfonic acid and a salt thereof; a nonionic hydrophilic monomer of (meth)acrylamide, N-substituted (meth)acrylate, 2-hydroxyethyl(meth)acrylate, 2-hydroxypropyl(meth)acrylate, methoxypolyethyleneglycol(meth) acrylate, or polyethyleneglycol(meth)acrylate; and an amino-containing unsaturated monomer of (N,N)-dimethylaminoethyl(meth)acrylate or (N,N)-dimethylaminopropyl (meth)acrylamide, and a quaternary compound thereof may be used.

The water-soluble ethylene-based unsaturated monomer may have acidic groups, and at least some of the acidic groups may be neutralized. Preferably, those obtained by partially neutralizing the monomers with an alkali substance such as sodium hydroxide, potassium hydroxide, and ammonium hydroxide may be used.

Herein, a degree of neutralization of the monomer may be 40 to 95 mol %, 40 to 80 mol %, or 45 to 75 mol %. A range of the degree of neutralization may vary depending on the final physical properties. An excessively high degree of neutralization causes the neutralized monomers to be precipitated, and thus polymerization may not readily occur. On the contrary, an excessively low degree of neutralization not only deteriorates absorbency of the polymer, but also gives the polymer hard-to-handle properties, such as those of an elastic rubber.

The monomer composition may include a polymerization initiator generally used in the preparation of a super absorbent polymer.

The polymerization initiator may be an initiator for thermal polymerization or an initiator for photopolymerization according to the polymerization method. However, even when the photopolymerization method is applied thereto, a certain amount heat is generated by UV radiation and the like, and some heat occurs as the polymerization reaction, an exothermal reaction, progresses. Therefore, the composition may additionally include the thermal polymerization initiator.

For example, the photopolymerization initiator may be one or more compounds selected from the group consisting of benzoin ether, dialkyl acetophenone, hydroxyl alkylketone, phenyl glyoxylate, benzyl dimethyl ketal, acyl phosphine, and α-aminoketone. Further, as the specific example of acyl phosphine, commercial Lucirin TPO, namely, 2,4,6-trimethyl-benzoyl-trimethyl phosphine oxide, may be used. More various photopolymerization initiators are well disclosed in "UV Coatings: Basics, Recent Developments and New Application (Elsevier, 2007)" written by Reinhold Schwalm, p 115.

Furthermore, as the thermal polymerization initiator, one or more initiators selected from the group consisting of a persulfate-based initiator, an azo-based initiator, hydrogen peroxide, and ascorbic acid may be used. Specifically, sodium persulfate ($Na_2S_2O_8$), potassium persulfate ($K_2S_2O_8$), ammonium persulfate ($(NH_4)_2S_2O_8$), and the like may be used as examples of the persulfate-based initiator; and 2,2-azobis(2-amidinopropane) dihydrochloride, 2,2-azobis-(N,N-dimethylene)isobutyramidine dihydrochloride, 2-(carbamoylazo)isobutylonitril, 2,2-azobis[2-(2-imidazolin-2-yl)propane]dihydrochloride, 4,4-azobis-(4-cyanovaleric acid), and the like may be used as examples of the azo-based initiator. More various thermal polymerization initiators are well disclosed in "Principle of Polymerization (Wiley, 1981)" written by Odian, p 203.

The polymerization initiator may be added at a concentration of 0.001 to 1 wt %, or 0.005 to 0.1 wt % based on the monomer composition. When the concentration of the polymerization initiator is excessively low, the polymerization rate may become slow, and a large amount of residual monomers may be extracted from the final product. Conversely, when the concentration of the polymerization initiator is excessively high, polymer chains forming a network are shortened, so that the extractable content increases and absorbency under pressure decreases, thereby lowering physical properties of the polymer.

Meanwhile, the polymerization of the monomer composition is performed in the presence of a cross-linking agent ("internal cross-linking agent") to improve physical properties of the polymer by polymerization of the water-soluble ethylene-based unsaturated monomer. The cross-linking agent is for internal cross-linking of the hydrogel polymer, and may be used separately from a "surface cross-linking agent" to be described later.

As the internal cross-linking agent, any compound can be used as long as it allows the introduction of cross-linking bonds during polymerization of the water-soluble ethylene-based unsaturated monomer. As a non-limiting example, the internal cross-linking agent may be a multifunctional cross-linking agent such as N,N'-methylenebisacrylamide, trimethylolpropane tri(meth)acrylate, ethyleneglycol di(meth)acrylate, polyethyleneglycol di(meth)acrylate, propyleneglycol di(meth)acrylate, polypropyleneglycol di(meth)acrylate, butanediol di(meth)acrylate, butyleneglycol di(meth)acrylate, diethyleneglycol di(meth)acrylate, hexanediol di(meth)acrylate, triethyleneglycol di(meth)acrylate, tripropyleneglycol di(meth)acrylate, tetraethyleneglycol di(meth)acrylate, dipentaerythritol pentaacrylate, glycerin tri(meth)acrylate, pentaerythritol tetraacrylate, triarylamine, allyl (meth)acrylate, ethylene glycol diglycidyl ether, propylene glycol, glycerin, or ethylene carbonate, and these may be used alone or in combination of two or more.

The internal cross-linking agent may be added at a concentration of 0.001 to 1 wt %, 0.01 to 0.8 wt %, or 0.1 to 0.7 wt % based on the monomer composition. That is, when the concentration of the internal cross-linking agent is too low, the absorption rate of the polymer may be lowered and gel strength may be weakened, which is not preferable. Conversely, when the concentration of the internal cross-linking agent is too high, the absorbency of the polymer is lowered, making it undesirable as an absorbent.

In addition, the cross-linking polymerization of the monomer composition is performed in the presence of a foaming agent depending on the need and degree of improvement in absorption rate. Such a foaming agent may be decomposed during the cross-linking polymerization to generate gas, thereby forming pores in the hydrogel polymer. As a result, when such a foaming agent is additionally used, a more developed porous structure is formed in the super absorbent polymer, so that the absorption rate of the super absorbent polymer can be further improved.

As a non-limiting example, the foaming agent may include at least one compound selected from the group consisting of sodium bicarbonate, sodium carbonate, potassium bicarbonate, potassium carbonate, calcium bicarbonate, calcium carbonate, magnesium bicarbonate, magnesium carbonate, azodicarbonamide (ADCA), dinitroso pentamethylene tetramine (DPT), p,p'-oxybis(benzenesulfonyl hydrazide) (OBSH), p-toluenesulfonyl hydrazide (TSH), sucrose stearate, sucrose palmitate, and sucrose laurate.

The foaming agent may be present in the monomer composition in an amount of 1000 to 4000 ppmw. More specifically, it may be present in an amount of 1000 ppm or more, 1100 ppmw or more, or 1200 ppmw or more; and 4000 ppmw or less, 3500 ppmw or less, or 3000 ppmw or less.

In addition, the monomer composition may further include a thickener, a plasticizer, a preservation stabilizer, an antioxidant, or the like, if necessary.

In addition, such a monomer composition may be prepared in the form of a solution in which raw materials such as the above-described water-soluble ethylene-based unsaturated monomer, polymerization initiator, internal cross-linking agent, and foaming agent are dissolved in a solvent.

At this time, any solvent which can dissolve the raw materials may be used without limitation, and for example, water, ethanol, ethyleneglycol, diethyleneglycol, triethyleneglycol, 1,4-butanediol, propyleneglycol, ethyleneglycol monobutylether, propyleneglycol monomethylether, propyleneglycol monomethylether acetate, methylethylketone, acetone, methylamylketone, cyclohexanone, cyclopentanone, diethyleneglycol monomethylether, diethyleneglycol ethylether, toluene, xylene, butyrolactone, carbitol, methylcellosolve acetate, N,N-dimethylacetamide, or a mixture thereof can be used.

The formation of the hydrogel polymer by polymerizing the monomer composition may be performed by a conventional polymerization method, and the process is not particularly limited.

As a non-limiting example, the polymerization method is largely divided into the thermal polymerization and the photopolymerization according to an energy source of the polymerization. In the case of thermal polymerization, it is generally carried out in a reactor equipped with an agitation spindle, such as a kneader. In the case of photopolymerization, it may be carried out in a reactor equipped with a movable conveyor belt.

For example, the hydrogel polymer may be obtained by introducing the monomer composition into a reactor equipped with an agitation spindle such as a kneader, followed by supplying hot air, or heating the reactor to perform thermal polymerization. The hydrogel polymer may be discharged to a reactor outlet in the form of particles with several centimeters to several millimeters depending on a shape of the agitation spindle provided in the reactor. Specifically, a shape of the hydrogel polymer obtained may vary depending on the concentration and injection rate of the monomer mixture to be injected, and a hydrogel polymer having a (weight average) particle diameter of 2 to 50 mm may be usually obtained.

As another example, when photopolymerization is performed on the monomer composition in the reactor equipped with a movable conveyor belt, a hydrogel polymer in the form of a sheet may be obtained. At this time, a thickness of the sheet may vary depending on the concentration and injection rate of the monomer composition to be injected. It is preferable to adjust the thickness to 0.5 to 10 cm in order to ensure the production rate while allowing the entire sheet to be polymerized evenly.

The hydrogel polymer formed in this way may exhibit a moisture content of 40 to 80 wt %. At this time, the moisture content is the weight occupied by moisture in the total weight of the hydrogel polymer, and it means a value of which the weight of the dried polymer is subtracted from the weight of the hydrogel polymer. Specifically, the moisture content is defined as a value calculated by measuring the weight loss due to moisture evaporation from the polymer in the process of increasing the temperature of the polymer for drying through infrared heating. At this time, the drying condition is as follows: the temperature is increased to about 180° C. and maintained at 180° C., and the total drying time is 20 minutes including 5 minutes of a heating step.

(Gel Pulverization Step)

In addition, the present disclosure includes a gel pulverization step of pulverizing the hydrogel polymer obtained above to form hydrogel particles.

At this time, there is no limitation in the configuration of the pulverizing machine used in the gel pulverization step. Specifically, at least one pulverizing machine selected from the group consisting of a vertical pulverizer, a turbo cutter, a turbo grinder, a rotary cutter mill, a cutter mill, a disc mill, a shred crusher, a crusher, a chopper and a disc cutter may be used, but the present disclosure is not limited thereto.

Herein, the hydrogel polymer may be pulverized so that the particle diameter is about 2 to about 20 mm. Gel pulverization to a particle diameter of less than 2 mm is not technically easy due to the high moisture content of the hydrogel polymer, and a phenomenon of agglomeration between the pulverized particles may occur. On the other hand, when pulverized to a particle diameter of more than 20 mm, an increase in efficiency of the subsequent drying step may be insignificant.

(Drying, Pulverization, and Classification Step)

In addition, the present disclosure may include a first classification step of drying, pulverizing, and classifying the hydrogel particles to separate them into a base resin normal powder and a base resin fine powder, after preparing the hydrogel particles.

The drying temperature in the drying step may be about 150 to about 250° C. When the drying temperature is less than 150° C., the drying time may become excessively long and physical properties of the super absorbent polymer to be finally formed may decrease. When the drying temperature is more than 250° C., only the surface of the polymer is excessively dried, a fine powder may be generated in the subsequent pulverization process, and physical properties of the super absorbent polymer to be finally formed may decrease. Therefore, the drying may preferably be performed at a temperature of about 150 to about 220° C., more preferably at a temperature of about 170 to about 200° C.

Meanwhile, the drying time may be about 20 minutes to about 90 minutes in consideration of process efficiency, but is not limited thereto.

The drying method in the drying step is not particularly limited if it has been generally used in the drying process of the hydrogel polymer. Specifically, the drying step may be performed by the method of hot air provision, infrared radiation, microwave radiation, UV ray radiation, and the like. After the drying step, the moisture content of the polymer may be about 0.1 to about 10 wt %.

Subsequently, a step of pulverizing the dried polymer obtained through the drying step is performed.

The polymer powder obtained after the pulverization step may have a particle diameter of about 150 to about 850 μm. As the pulverizing machine used for pulverization to such a particle diameter, a pin mill, a hammer mill, a screw mill, a roll mill, a disc mill, a jog mill, or the like may be used, but the present disclosure is not limited thereto.

In order to control physical properties of the super absorbent polymer powder to be prepared as a final product after such a pulverization step, the polymer powder obtained after the pulverization is generally classified according to the particle size. Preferably, a classification into particles having a particle diameter of 150 μm or less and particles having a particle diameter of greater than about 150 μm and 850 μm or less is performed.

The "particle diameter or particle size" may be measured by a standard sieve analysis or a laser diffraction method, preferably by a standard sieve analysis, otherwise specified herein. The "average particle diameter or weight average particle diameter" may mean a particle diameter (D50) at 50% of the weight percentage in the particle size distribution curve obtained by laser diffraction.

In the present disclosure, fine particles having a particle diameter of a predetermined particle size or less, i.e., about 150 μm or less, are referred to as a base resin fine powder, a super absorbent polymer fine powder, a SAP fine powder or a fine powder (fines), and particles having a particle diameter of more than 150 μm and 850 μm or less are referred to as normal particles.

(Surface Cross-Linking Step)

In addition, the present disclosure includes a surface cross-linking step of forming super absorbent polymer particles by cross-linking the surface of the base resin powder in the presence of a surface cross-linking agent.

When this surface cross-linking step is performed, an additional surface cross-linked layer may be formed on the base resin powder. This surface cross-linking step may be performed under general surface cross-linking conditions of the super absorbent polymer, and may be performed, for example, by mixing a solution containing a surface cross-linking agent and the base resin powder.

Herein, C2 to C5 alkylene carbonate, which is a compound capable of reacting with a functional group of the base resin powder, is preferable as the surface cross-linking agent. More preferably, ethylene carbonate may be used as the surface cross-linking agent. In addition, along with the surface cross-linking agent, porous silica or clay may be further included. Furthermore, an acidic compound or a polymer may be further added as needed to control the penetration rate and depth of the surface cross-linking agent.

At this time, the content of the surface cross-linking agent may be appropriately adjusted depending on the type of the cross-linking agent or reaction conditions, and is preferably 0.001 to 5 parts by weight, 0.01 to 4 parts by weight, or 0.1 to 3 parts by weight based on 100 parts by weight of the base resin powder. When the content of the surface cross-linking agent is excessively low, surface modification may not be performed properly, and permeability or gel strength of the final polymer may be deteriorated. Conversely, when an excessive amount of the surface cross-linking agent is used, absorbency of the polymer may be rather deteriorated due to excessive surface cross-linking, which is undesirable.

In addition, the surface cross-linking step may be performed by a method of adding the surface cross-linking agent and the base resin powder in a reactor for mixing, a method of spraying the surface cross-linking agent onto the base resin powder, or a method of mixing the base resin powder and the surface cross-linking agent while continuously providing them to a continuously operating mixer.

In addition, water may be additionally added when adding the surface cross-linking agent. When adding the surface cross-linking agent and water together, uniform dispersion of the surface cross-linking agent can be induced, agglomeration of polymer particles can be prevented, and penetration depth of the surface cross-linking agent into the polymer particles can be further optimized. Considering these objects and effects, the amount of water added together with the surface cross-linking agent may be adjusted to 0.5 to 10 parts by weight based on 100 parts by weight of the base resin powder.

In addition, the surface cross-linking step may be performed at a temperature of 100 to 250° C. In addition, the surface modification may be performed for 1 minute to 120 minutes, preferably 1 minute to 100 minutes, and more preferably 10 minutes to 80 minutes. That is, the surface cross-linking step may be performed under the above-described conditions in order to induce a minimum surface cross-linking reaction and prevent a deterioration in physical properties due to damage on polymer particles during excessive reaction.

(Second Classification Step)

In addition, the present disclosure includes a second classification step of classifying the super absorbent polymer particles that have undergone the surface cross-linking step into a super absorbent polymer normal powder and a super absorbent polymer fine powder. After the surface cross-linking, they are classified into a super absorbent polymer fine powder having a particle diameter of 150 μm or less and super absorbent polymer normal particles having a particle diameter of more than 150 μm and 850 μm or less. The super absorbent polymer fine powder having a particle diameter of 150 μm or less may be reintroduced to the process for reassembling the fine powder according to the present disclosure to be described later, and the super absorbent polymer normal particles may be commercialized and used.

(Fine Reassembling and Reintroducing Step)

In the preparation method of a super absorbent polymer of the present disclosure, the above-described base resin fine powder and the super absorbent polymer fine powder that has undergone the surface cross-linking are mixed with an aqueous dispersion of a water-insoluble inorganic salt to prepare a fine reassembly, and the fine reassembly is reintroduced to the gel pulverization step.

The fine powder may be generated during a polymerization process, a drying process, or a pulverization process of the dried polymer. When the fine powder is included in the final product, the final product is difficult to handle and the fine powder may deteriorate physical properties such as exhibiting a gel blocking phenomenon. Therefore, it is desirable to exclude the fine powder from being included in the final product or to reassemble the fine powder into normal particles.

For example, a reassembly process of aggregating the fine particles to a normal particle size may be performed. A reassembly process in which fine particles are aggregated in a wet state is generally performed to increase cohesive strength. The fine reassembly produced in the reassembly process has low drying efficiency compared to the polymer, thereby lowering productivity and reducing water retention capacity of the base resin, resulting in a deterioration in the quality of the final super absorbent polymer. Although the amount of water used during the reassembly process can be reduced to improve the drying efficiency, there is a problem in that crushing rate after drying is high due to the low reassembly strength, thereby increasing the amount of fine powder to be generated.

However, as described above, the preparation method according to one embodiment of the present disclosure can improve the drying efficiency while appropriately controlling the amount of fine powder to be generated by mixing the fine powder with an aqueous dispersion of a water-insoluble inorganic salt, thereby increasing water retention capacity of the base resin and further improving absorption properties of the product.

The water-insoluble inorganic salt is not limited as long as it is a material used as a material for facilitating the formation of pores in the fine reassembly, and is preferably at least one selected from the group consisting of potassium carbonate, sodium carbonate, calcium carbonate, and magnesium carbonate. Such a water-insoluble inorganic salt may be added in the reassembly process to form appropriate pores, thereby improving the drying efficiency of the fine reassembly and further the drying efficiency of the base resin.

The water-insoluble inorganic salt may be included in an amount of 50 to 4000 ppm based on a total weight of the base resin fine powder and the super absorbent polymer fine powder. Preferably, the water-insoluble inorganic salt may be included in an amount of 70 ppm or more, 80 ppm or more, or 100 ppm or more, and 3700 ppm or less, 3300 ppm or less, or 3000 ppm or less based on a total weight of the base resin fine powder and the super absorbent polymer fine powder. When the water-insoluble inorganic salt is included in the above range, it is possible to form pores evenly in the fine reassembly process, thereby improving the drying efficiency and preparing a fine powder having appropriate crushing strength.

In addition, the aqueous dispersion of the water-insoluble inorganic salt may be included in an amount of 50 to 120 parts by weight, preferably 60 to 110 parts by weight, or 70 to 100 parts by weight based on 100 parts by weight of the base resin fine powder and the super absorbent polymer fine powder. When the amount of the aqueous dispersion is too small, it is difficult to evenly disperse a small amount of water due to the fast absorption rate of the fine powder, and uniformity of the fine reassembly may be deteriorated. In addition, when the moisture content of the prepared fine reassembly is reduced, the amount of re-fines to be generated increases, and absorption properties of the final super absorbent polymer may be deteriorated. On the other hand, when the amount of the aqueous dispersion exceeds the above range, stickiness of the fine reassembly increases, which prevents normal mixing. And, the amount of water to be evaporated during the drying process increases, resulting in process problems such as an increase in the load of the dryer.

In addition, a temperature of the aqueous dispersion of the water-insoluble inorganic salt may be adjusted to 10 to 90° C., 20 to 80° C., or 30 to 70° C. so as not to impose a load on the apparatus for producing the fine reassembly while improving cohesive strength of the fine reassembly.

The step of preparing the fine reassembly using the aqueous dispersion of the water-insoluble inorganic salt may be performed using a mixing device or a mixer capable of applying shear force. Specifically, the fine powder and the aqueous dispersion of the water-insoluble inorganic salt may be stirred and mixed at 100 to 2000 rpm, 200 to 1500 rpm, or 400 to 1000 rpm using a mixing device or a mixer. When stirring at a speed within the above range, homogeneous mixing is possible by applying sufficient shear force.

In addition, according to one embodiment of the present disclosure, a drying process may be optionally further performed on the fine reassembly. The drying temperature of the fine reassembly may be adjusted according to the amount of water added. For example, it may be performed at about 100 to about 200° C., and the moisture content may be adjusted to about 1 to about 2 wt %.

The step of drying the fine reassembly may be performed using a conventional drying device, for example, a hot air dryer, a paddle-type dryer, or a forced circulation-type dryer.

As described above, the fine reassembly produced according to the preparation method of the fine reassembly of the present disclosure is introduced into the gel pulverization step of the hydrogel polymer formed through the polymerization step as described above, mixed with the hydrogel polymer, and then pulverized to obtain hydrogel particles.

According to one embodiment of the present disclosure, when the fine reassembly is added to the gel pulverization step, the fine reassembly is added in an amount of 10 to 100 parts by weight, preferably 15 to 100 parts by weight, 20 to 100 parts by weight, or 25 to 100 parts by weight based on 100 parts by weight of the hydrogel polymer. When the mixing amount of the hydrogel polymer and the fine reassembly is adjusted within the above-mentioned range, it is possible to easily recycle the fine powder generated in the manufacturing process while maintaining excellent absorption properties of the base resin and the super absorbent polymer.

Meanwhile, a weight ratio of the base resin fine powder to the super absorbent polymer fine powder used in the preparation of the fine reassembly may be 5:1 to 15:1, preferably 7:1 to 13:1, or 8:1 to 11:1. The content range can be appropriately selected in consideration of the amount of fine powder generated in a series of manufacturing steps. However, when the base resin fine powder and the super absorbent polymer fine powder are used within the above range, the fine reassembly has excellent strength.

Preferably, the moisture content of the base resin including the fine reassembly may be 0.05 to 1 wt %, preferably 0.08 to 0.8 wt %, or 0.1 to 0.6 wt % based on the weight of the base resin. The moisture content of the base resin refers to a moisture content of the base resin after mixing the fine reassembly prepared according to the present disclosure with the hydrogel polymer, followed by gel pulverization and first classification. The base resin including the fine reassembly of the present disclosure contains a water-insoluble inorganic salt without reducing the amount of water used in the fine reassembly process, so that the drying efficiency of the fine reassembly is improved. Accordingly, the moisture content of the base resin may be kept low within the above range, and CRC of the base resin and the final super absorbent polymer may be increased.

In addition, the base resin fine powder and the super absorbent polymer fine powder may be present in an amount of 15 to 45 wt % based on the total weight of the normal powder and fine powder. More specifically, the base resin fine powder and the super absorbent polymer fine powder may be present within the above range with respect to the total weight of the base resin normal powder, the base resin fine powder, the super absorbent polymer normal powder, and the super absorbent polymer fine powder prepared through the first and second classification steps. According to the above-described preparation method of the present disclosure, the amount of fine powder inevitably generated in a series of manufacturing processes of the super absorbent polymer can be appropriately controlled within the above range.

In addition, the super absorbent polymer prepared according to the preparation method of the present disclosure has excellent CRC, AUP, vortex and permeability.

The term "CRC (Centrifugal Retention Capacity)" used in the present disclosure means the amount of solution that can be absorbed under no load. The CRC can be measured according to EDANA WSP 241.3, and a specific measurement method is described in detail in the following examples. Preferably, the CRC of the base resin is 35 to 40 g/g, or 35.5 to 37 g/g. Preferably, the CRC of the super absorbent polymer is 27 to 40 g/g, or 27.5 to 35 g/g.

The term "AUP (Absorbency Under Pressure)" used in the present disclosure means the amount of solution that can be absorbed under a certain pressure. The AUP can be measured according to EDANA WSP 242.3, and a specific measurement method is described in detail in the following examples. Preferably, the AUP of the super absorbent polymer is 24 to 30 g/g. More preferably, the AUP of the super absorbent polymer is 24.5 g/g or more.

The term "vortex" used in the present disclosure is also referred to as absorption rate, and means the rate at which a solution is absorbed into the super absorbent polymer. The specific measurement method of the vortex is described in detail in the following examples. Preferably, the vortex of the super absorbent polymer is 50 seconds or less. More preferably, the vortex of the super absorbent polymer is 49 seconds or less, 48 seconds or less, or 47 seconds or less. Meanwhile, as the lower vortex time can be evaluated as the better, the lower limit is theoretically 0 seconds, but may be 30 seconds or more, 35 seconds or more, or 40 seconds or more.

The term "permeability" used in the present disclosure means the ability to rapidly transfer a solution absorbed in a super absorbent polymer to another super absorbent polymer, i.e., the mobility of a solution in a super absorbent polymer. The specific measurement method of the permeability is described in detail in the following examples. Preferably, the permeability of the super absorbent polymer is 60 seconds or less. More preferably, the permeability of the super absorbent polymer is 55 seconds or less, 52 seconds or less, or 50 seconds or less. Meanwhile, as the lower permeability can be evaluated as the better, the lower limit is theoretically 0 seconds, but may be 30 seconds or more, 35 seconds or more, or 40 seconds or more.

Advantageous Effects

The preparation method of a super absorbent polymer of the present disclosure effectively reassembles the fine powder inevitably obtained in the preparation of the super absorbent polymer, thereby providing a super absorbent polymer having excellent drying efficiency and absorption properties.

DETAILED DESCRIPTION OF THE EMBODIMENTS

Hereinafter, the function and effect of the present invention will be described in more detail through specific examples. However, these examples are for illustrative purposes only, and the invention is not intended to be limited by these examples.

Example 1

(Step 1)

Formation of Hydrogel Polymer

A monomer solution was prepared by mixing 0.4 parts by weight of polyethylene glycol diacrylate (weight average molecular weight: ~500 g/mol) and 0.1 parts by weight of hexanediol diacrylate as an internal cross-linking agent, and 0.1 parts by weight of IRGACURE 819 as a photoinitiator with 100 parts by weight of acrylic acid. Subsequently, while continuously supplying the monomer solution to a metering pump, 140 parts by weight of a 31 wt % sodium hydroxide aqueous solution was continuously line-mixed to prepare a monomer aqueous solution. At this time, after confirming that the temperature of the monomer aqueous solution had risen to about 72° C. or higher by the heat of neutralization, the solution was allowed to stand until the temperature was cooled to 40° C.

When cooled down to the temperature of 40° C., solid sodium bicarbonate as a foaming agent was added to the monomer aqueous solution in an amount shown in Table 1 below, and 6 parts by weight of a 2 wt % sodium persulfate aqueous solution was added at the same time.

The solution was poured into a Vat-type tray (15 cm wide×15 cm long) installed in a square polymerizer, wherein the polymerizer was provided with a light irradiation device on the top and preheated to 80° C., and then light irradiation was performed to initiate photopolymerization. It was confirmed that a gel was generated from the surface after about 15 seconds of light irradiation, and a polymerization reaction occurred simultaneously with foaming after about 30 seconds. And, the reaction was further conducted for 3 minutes to obtain a hydrogel polymer in the form of a sheet.

(Step 2)

Preparation of Fine Reassembly

A total of 1000 g of the base resin fine powder prepared in Step 5 and the super absorbent polymer fine powder prepared in Step 7 (base resin fine powder weight: super absorbent polymer fine powder weight=9:1) were prepared, and put in a mixer. While stirring at 800 rpm, 1000 g of water at 60° C. containing 0.1 g of $CaCO_3$ was added thereto and mixed for 20 seconds to prepare a fine reassembly.

(Step 3)

Gel Pulverization

The hydrogel polymer obtained in step 1 and the fine reassembly obtained in step 2 were mixed at a ratio of 3:1, and then 200 g of water was sprayed evenly for lubrication, followed by pulverization with a chopper having a 10 mm hole plate.

(Step 4)

Drying

The pulverized polymer obtained in step 3 was dried in a dryer capable of changing wind direction up and down. The hydrogel polymer was uniformly dried by flowing hot air at 180° C. from the bottom to the top for 15 minutes, and then flowing from the top to the bottom for 15 minutes, so that the moisture content of the dried powder was about 2% or less.

(Step 5)

First Classification

The dried polymer obtained in step 4 was pulverized with a pulverizing machine, and then classified to obtain base resin normal particles having a particle diameter of 150 μm to 850 μm and a base resin fine powder having a particle diameter of 150 μm or less. At this time, the base resin fine particles were used in the step of preparing the fine reassembly of step 2.

(Step 6)

Surface Cross-Linking 6 g of a surface cross-linking agent aqueous solution containing 3 parts by weight of ethylene carbonate was sprayed onto 100 parts by weight of the base resin powder obtained in step 5, and stirred at room temperature to mix the surface cross-linking solution evenly on the base resin powder. Then, the base resin powder mixed with the surface cross-linking solution was put into a surface cross-linking reactor, and the surface cross-linking reaction was performed. In this surface cross-linking reactor, it was confirmed that the temperature of the base resin powder gradually increased from an initial temperature of about 80° C. and operation was performed to reach the maximum reaction temperature of 190° C. after 30 minutes. After reaching the maximum reaction temperature, the reaction was further conducted for 15 minutes, and a sample of the super absorbent polymer was finally prepared.

(Step 7)

Second Classification

After the surface cross-linking process, classification was performed using an ASTM standard mesh to prepare a super absorbent polymer normal powder having a particle diameter of 150 μm to 850 μm and a super absorbent polymer fine powder having a particle diameter of 150 μm or less. At this time, the super absorbent polymer fine powder was used in the step of preparing the fine reassembly of step 2.

Example 2 and Example 3

A super absorbent polymer was prepared in the same manner as in Example 1, except that materials were used in the amounts shown in Table 1 below in the preparation of the fine reassembly in Step 2.

Comparative Examples 1 to 3 and Reference Example

A super absorbent polymer was prepared in the same manner as in Example 1, except that materials were used in the amounts shown in Table 1 below in the preparation of the fine reassembly in Step 2.

TABLE 1

| | Pore-forming material content based on total amount of fine powder (ppm) | Water input when reassembling fine powder (fine reassembly: water) |
|---|---|---|
| Example 1 | 100 | 1:1 |
| Example 2 | 1000 | 1:1 |
| Example 3 | 3000 | 1:1 |
| Comparative Example 1 | 0 | 1:1 |
| Comparative Example 2 | 0 | 1:0.8 |
| Comparative Example 3 | 0 | 1:0.6 |
| Reference Example | 5000 | 1:1 |

Experimental Example

Physical properties of the super absorbent polymer prepared above was measured by the following method.

(1) CRC

The centrifugal retention capacity of each polymer was measured according to EDANA WSP 241.3.

After inserting $W_0$ (g, about 0.2 g) of the base resin or the super absorbent polymer uniformly in a nonwoven fabric envelope and sealing the same, it was soaked in saline (0.9 wt %) at room temperature. After 30 minutes, the envelope was centrifuged at 250 G for 3 minutes to drain, and the weight $W_2$ (g) of the envelope was measured. Further, after carrying out the same operation without using the super absorbent polymer, the weight $W_1$ (g) of the envelope was measured. Then, CRC (g/g) was calculated by using the obtained weight values according to the following Equation.

$$CRC(g/g) = \{[W_2(g) - W_1(g)]/W_0(g)\} - 1 \quad \text{[Equation 1]}$$

(2) Moisture Content of Base Resin

The moisture content was calculated with the weight before drying (a) and the weight after drying (b) of the base resin specimen. At this time, the drying of the specimen was carried out at 140° C. for 10 minutes.

$$\text{Moisture content of base resin (\%)} = (a - b)/a * 100 \quad \text{[Equation 2]}$$

(3) 0.7 AUP

The absorbency under pressure at 0.7 psi (or 0.18 psi) of the super absorbent polymer was measured according to EDANA WSP 242.3.

In the AUP measurement, the polymer classified in the CRC measurement was used.

Specifically, a 400 mesh stainless steel screen was installed in a cylindrical bottom of a plastic having an inner diameter of 25 mm. $W_0$ (g, 0.16 g) of the super absorbent polymer was uniformly scattered on the screen at room temperature and a humidity of 50%. Thereafter, a piston which can uniformly provide a load of 0.7 psi (or 0.18 psi) was placed thereon. Herein, the outer diameter of the piston was slightly smaller than 25 mm, there was no gap with the inner wall of the cylinder, and jig-jog of the cylinder was not interrupted. At this time, the weight $W_3$ (g) of the device was measured.

Subsequently, a glass filter having a diameter of 90 mm and a thickness of 5 mm was placed in a petri dish having a diameter of 150 mm, and saline composed of 0.9 wt % sodium chloride was poured in the dish. At this time, the saline was poured until the surface level of the saline became equal to the upper surface of the glass filter. One sheet of filter paper with a diameter of 90 mm was placed thereon. After the measuring device was placed on the filter paper, the liquid was absorbed for 1 hour under a load. After 1 hour, the measuring device was lifted, and the weight $W_4$ (g) was measured.

Then, absorbency under pressure (g/g) was calculated by using the obtained weight values according to the following Equation.

$$AUP(g/g) = [W_4(g) - W_3(g)]/W_0(g) \quad \text{[Equation 3]}$$

(4) EFFC

The effective absorption capacity (EFFC) was obtained by substituting centrifugal retention capacity (CRC) measured in (1) and absorbency under pressure (AUP) at 0.7 psi measured in (3) above into Equation 4 below.

$$EFFC = \{CRC + 0.7 \text{ psi } AUP\}/2 \quad \text{[Equation 4]}$$

(5) Permeability

The permeability was measured by the following Equation.

$$Perm = [20 \text{ mL}/T1(\text{sec})] * 60 \text{ sec} \quad \text{[Equation 5]}$$

In the Equation 5,

Perm is permeability of super absorbent polymer, and

T1 is the time (in seconds) taken for 20 mL of physiological saline to pass through the swollen super absorbent polymer under a pressure of 0.3 psi, after adding 0.2 g of the super absorbent polymer in a cylinder and then pouring physiological saline (0.9 wt % sodium chloride aqueous solution) thereto so that the super absorbent polymer is completely immersed to be swollen for 30 minutes.

Specifically, a cylinder and a piston were prepared. As the cylinder, a cylinder having an inner diameter of 20 mm equipped with a glass filter and a stopcock at the bottom was used. A piston including a screen having an outer diameter slightly smaller than 20 mm and capable of freely moving the cylinder up and down is placed at the bottom, a weight is placed at the top, and a rod connecting the screen and the weight was used. The piston was equipped with a weight capable of applying a pressure of 0.3 psi by the addition of the piston.

With the stopcock of the cylinder closed, 0.2 g of the super absorbent polymer was added, and an excess of physiological saline (0.9 wt % sodium chloride aqueous solution) was poured so that the super absorbent polymer was completely immersed. Then, the super absorbent polymer was swollen for 30 minutes. Thereafter, a piston was added to uniformly apply a load of 0.3 psi on the swollen super absorbent polymer.

Subsequently, the time taken for 20 mL of physiological saline to pass through the swollen super absorbent polymer was measured in seconds by opening the stopcock of the cylinder. At this time, the meniscus when the cylinder was filled with 40 mL of physiological saline, and the meniscus when the cylinder was filled with 20 mL of physiological saline were marked. Then, the time taken to reach the level corresponding to 20 ml from the level corresponding to 40 mL was measured to easily measure the T1 of the above Equation 4.

(6) Vortex

The vortex was measured in seconds according to the method described in International Patent Publication No. 1987-003208.

Specifically, 2 g of a super absorbent polymer was added to 50 mL of saline at 24° C., and a magnetic bar (8 mm in diameter, 31.8 mm in length) was stirred at 600 rpm to measure the time taken until the vortex disappeared in seconds.

(7) Recycle Amount of Fine Powder

The recycle amount of fine powder was defined by the following Equation.

$$\text{Recycle amount of fine powder} = [(A1 + A3)/(A1 + A2 + A3 + A4)] * 100 \quad \text{[Equation 6]}$$

In the Equation 6,

A1 is a weight of the base resin fine powder,

A2 is a weight of the base resin normal powder,

A3 is a weight of the super absorbent polymer fine powder, and

A4 is a weight of the super absorbent polymer normal powder.

TABLE 2

| | Base resin CRC (g/g) | | Moisture | CRC (g/g) | | | | | | Recycle |
|---|---|---|---|---|---|---|---|---|---|---|
| | | *Rate of change (%) | content of base resin (%) | | *Rate of change (%) | 0.7 AUP (g/g) | EEFC | Permeability (sec) | Vortex (sec) | amount of fine powder (%) |
| Example 1 | 35.5 | 4.4 | 0.5 | 30.5 | 5.2 | 25.3 | 27.9 | 40 | 44 | 27.9 |
| Example 2 | 35.8 | 5.3 | 0.4 | 30.6 | 5.5 | 25.3 | 28.0 | 40 | 46 | 29.8 |
| Example 3 | 35.7 | 5.0 | 0.4 | 30.4 | 4.8 | 25.2 | 27.8 | 41 | 46 | 30.5 |
| Comparative Example 1 | 34 | — | 0.7 | 29 | — | 25.1 | 27.1 | 41 | 46 | 28.6 |
| Comparative Example 2 | 34.5 | 1.5 | 0.6 | 29.1 | 0.3 | 25.4 | 27.3 | 40 | 46 | 28.6 |
| Comparative Example 3 | 35 | 2.9 | 0.6 | 29.2 | 0.7 | 25.3 | 27.2 | 41 | 46 | 34.7 |
| Reference Example | 36 | 5.9 | 0.5 | 28.8 | -0.7 | 25 | 26.9 | 42 | 44 | 35.5 |

*Rate of change compared to Comparative Example 1

As shown in Table 2, it was confirmed that the preparation method of a super absorbent polymer of the present disclosure improved the drying efficiency without reducing the water input by adding a water-insoluble inorganic salt when preparing the fine reassembly, so that CRC of the super absorbent polymer having similar permeability and vortex was improved.

In particular, the super absorbent polymer prepared according to Examples of the present disclosure had excellent absorption properties compared to Comparative Example 2 in which the water input was simply reduced during the preparation of the fine reassembly. In addition, it was possible to reduce the recycle amount of fine powder while having excellent absorption properties compared to Comparative Example 3 in which the water input was further reduced. Meanwhile, in the case of Reference Example in which the fine reassembly was prepared by adding a larger amount of water-insoluble inorganic salt than Examples, it was confirmed that the recycle amount of fine powder increased.

The invention claimed is:

1. A preparation method of a super absorbent polymer, comprising:

cross-linking polymerizing a water-soluble ethylene-based unsaturated monomer having at least partially neutralized acidic groups in the presence of a polymerization initiator and an internal cross-linking agent to form a hydrogel polymer;

pulverizing the hydrogel polymer to form hydrogel particles;

drying, pulverizing, and classifying the hydrogel particles to separate them into a base resin normal powder and a base resin fine powder;

cross-linking a surface of the base resin powder in the presence of a surface cross-linking agent to form super absorbent polymer particles; and classifying the super absorbent polymer particles into a super absorbent polymer normal powder and a super absorbent polymer fine powder;

wherein the base resin fine powder and the super absorbent polymer fine powder are mixed with an aqueous dispersion of a water-insoluble inorganic salt to prepare a fine reassembly, and the fine reassembly is reintroduced during the pulverization of the hydrogel.

2. The preparation method of a super absorbent polymer of claim 1, wherein the water-insoluble inorganic salt is at least one selected from the group consisting of potassium carbonate, sodium carbonate, calcium carbonate, and magnesium carbonate.

3. The preparation method of a super absorbent polymer of claim 1, wherein the water-insoluble inorganic salt is included in an amount of 50 to 4000 ppm based on a total weight of the base resin fine powder and the super absorbent polymer fine powder.

4. The preparation method of a super absorbent polymer of claim 1, wherein the aqueous dispersion of the water-insoluble inorganic salt is included in an amount of 50 to 120 parts by weight based on 100 parts by weight of the base resin fine powder and the super absorbent polymer fine powder.

5. The preparation method of a super absorbent polymer of claim 1, wherein a temperature of the aqueous dispersion of the water-insoluble inorganic salt is 10 to 90° C.

6. The preparation method of a super absorbent polymer of claim 1, wherein the fine powder and the aqueous dispersion of the water-insoluble inorganic salt are mixed by stirring at 100 to 2000 rpm during the preparing the fine reassembly.

7. The preparation method of a super absorbent polymer of claim 1, wherein the fine reassembly is added in an amount of 10 to 100 parts by weight based on 100 parts by weight of the hydrogel polymer when added during the hydrogel pulverization.

8. The preparation method of a super absorbent polymer of claim 1, wherein a weight ratio of the base resin fine powder to the super absorbent polymer fine powder is 5:1 to 15:1 when preparing the fine reassembly.

9. The preparation method of a super absorbent polymer of claim 1, wherein a moisture content of the base resin comprising the fine reassembly is 0.05 to 1 wt % based on a weight of the base resin.

10. The preparation method of a super absorbent polymer of claim 1, wherein the base resin fine powder and the super absorbent polymer fine powder are present in an amount of 15 to 45 wt % based on a total weight of the normal powder and fine powder.

* * * * *